United States Patent
Dürr

(10) Patent No.: US 7,974,730 B2
(45) Date of Patent: Jul. 5, 2011

(54) METHOD FOR THE DISCONTINUOUS GRINDING OF BEVEL GEARS AND CORRESPONDING SOFTWARE FOR CONTROLLING A MULTIAXIS GRINDING MACHINE

(75) Inventor: Alexander Dürr, Saline, MI (US)

(73) Assignee: Klingelnberg AG, Zurich (CH)

( * ) Notice: Subject to any disclaimer, the term of this patent is extended or adjusted under 35 U.S.C. 154(b) by 320 days.

(21) Appl. No.: 12/209,536

(22) Filed: Sep. 12, 2008

(65) Prior Publication Data
US 2009/0068927 A1   Mar. 12, 2009

(30) Foreign Application Priority Data
Sep. 12, 2007  (EP) ..................... 07116203

(51) Int. Cl.
*G06F 19/00* (2006.01)
*B23F 9/10* (2006.01)
*B24B 1/00* (2006.01)

(52) U.S. Cl. ............... 700/164; 409/28; 451/47
(58) Field of Classification Search .................. 700/164; 409/28; 451/47
See application file for complete search history.

(56) References Cited

U.S. PATENT DOCUMENTS

| | | | | |
|---|---|---|---|---|
| 4,865,497 A | * | 9/1989 | Faulstich | 409/12 |
| 4,981,402 A | * | 1/1991 | Krenzer et al. | 409/26 |
| 5,014,467 A | * | 5/1991 | Luhmer et al. | 451/47 |
| 5,738,569 A | * | 4/1998 | Mackowsky | 451/56 |
| 6,050,883 A | * | 4/2000 | Wiener | 451/47 |
| 2009/0028655 A1 | * | 1/2009 | Ribbeck et al. | 409/27 |
| 2009/0060671 A1 | * | 3/2009 | Langerfeld | 409/27 |

FOREIGN PATENT DOCUMENTS

| | | |
|---|---|---|
| DE | 2833923 A1 | 8/1978 |
| EP | 0 330 289 A1 | 8/1989 |
| GB | 160832 | 3/1921 |

* cited by examiner

*Primary Examiner* — Ryan A Jarrett
(74) *Attorney, Agent, or Firm* — McCormick, Paulding & Huber LLP

(57) ABSTRACT

Method for the chip-removing machining of the tooth flanks of a gear wheel having n teeth and n tooth gaps on a multiaxis grinding machine. A grinding disc which may be dressed is used for the machining and one of the n tooth gaps after another is machined using this grinding disc in the single indexing method. The grinding disc plunges into each of the n tooth gaps up to a predefined plunging depth (T1). If it is a freshly dressed grinding disc, the grinding disc is plunged using a predefined first restraint in relation to the normal predefined plunging depth into m of the n tooth gaps at the beginning of the machining of the gear wheel, to pre-machine these m tooth gaps (for this purpose: m=1, 2, or 3 and m<n). The remaining n−m tooth gaps are subsequently machined using the predefined plunging depth (T1). The m tooth gaps are finally post-machined once again using the grinding disc, the grinding disc plunging into these m tooth gaps during this post-machining using a predefined second restraint of the normal predefined plunging depth.

11 Claims, 3 Drawing Sheets

US 7,974,730 B2

METHOD FOR THE DISCONTINUOUS GRINDING OF BEVEL GEARS AND CORRESPONDING SOFTWARE FOR CONTROLLING A MULTIAXIS GRINDING MACHINE

CROSS REFERENCE TO RELATED APPLICATION

This application claims the benefit of European Application No. 07 116 203.6, filed Sep. 12, 2007.

FIELD OF THE INVENTION

The invention relates to the discontinuous grinding of bevel and crown gears.

BACKGROUND OF THE INVENTION

There are methods for grinding the teeth of a bevel gear in the discontinuous method (intermittent indexing process), which is referred to as the single indexing method. The present invention relates to the discontinuous grinding of bevel gears, i.e., pinions and crown gears, whose tooth gaps are prefinished by a chip-removing method (e.g., milling).

Because the requirements in regard to the load capacity, precision, and quiet running have risen for the correspondingly manufactured gear wheels, these manufacturing methods have been refined and optimized.

In the single indexing method, one tooth gap after another is finish machined using a grinding disc. Grinding discs which may be dressed are preferably used for this purpose. When grinding pinions (also referred to as drive bevel gears) and crown gears machined in the single indexing method, a disproportionately high wear occurs at the beginning of the machining process on the freshly dressed grinding disc, which is also known as rapid wear. On one hand, this wear of the grinding disc has the result that the geometry of the grinding disc changes. This has the result that the tooth thickness also changes, if one does not compensate for this change of the geometry of the grinding disc by the setting of the machine data. This form of compensation, which is applied in the mass production of bevel gears for vehicles, for example, may be achieved by a specific restraint of the grinding disc. A corresponding linear compensation is shown in FIG. 2.

On the other hand, however, a change of the surface texture (micro-geometry) of the tooth flanks results due to the rapid wear. The first tooth flanks which were manufactured using the freshly dressed grinding discs have a different surface texture than those tooth flanks which were manufactured later using the same grinding disc. These micro-geometry differences are frequently accepted in regard to the short cycle times which are available in mass production, although the quiet running of such bevel gear sets is thus negatively influenced in particular.

In bevel gears which require an identical surface quality of all tooth flanks, until now the grinding machining was performed in multiple passes, which requires an additional time outlay.

It is therefore an object of the invention to provide a method and corresponding software which allow bevel gears to be produced having identical surface quality of all tooth flanks, with the simplest possible means and without drastic lengthening of the cycle times.

The object is achieved by a method having the features of the present invention. According to this method, after the dressing of a grinding disc, a number of artificial tooth gaps (also referred to as virtual tooth gap(s)) are manufactured on the workpiece, to thus bridge the rapid wear phase as quickly as possible. The surface texture is different in the artificial tooth gaps which were thus manufactured than in the tooth gaps which are now subsequently manufactured. However, because the artificial tooth gaps are reworked, or post-processed, during the subsequent manufacturing of the tooth gaps, these tooth gaps also receive a flank surface which is identical or nearly identical to the surface of all other tooth flanks.

In other words, the invention is based on one or more prior tooth systems having been worked out on the workpiece, before all tooth gaps are then processed using the grinding disc, after this disc has "overcome" the rapid wear phase.

These artificial tooth gap(s) or prior tooth system(s) is/are machined according to the invention while the freshly dressed grinding disc is held in a restraint position. I.e., the grinding disc does not plunge as deeply into the tooth gap to be manufactured in this restraint position as it does after the rapid wear phase has been overcome.

Advantageous embodiments of the method according to the invention and/or the corresponding software are further described.

BRIEF DESCRIPTION OF THE DRAWINGS

Exemplary embodiments of the invention are described in greater detail hereafter with reference to the drawings. In the figures.

DESCRIPTION OF THE PREFERRED EMBODIMENTS

Terms are used in connection with the present description which are also used in relevant standards. However, it is to be noted that the use of these terms is solely to serve for better understanding. The idea according to the invention and the scope of protection of the patent claims are not to be restricted in their extent by the specific selection of the terms. The invention may be transferred without further measures to other term systems and/or professional fields. The terms are to be applied accordingly and other professional fields.

Figure 1:
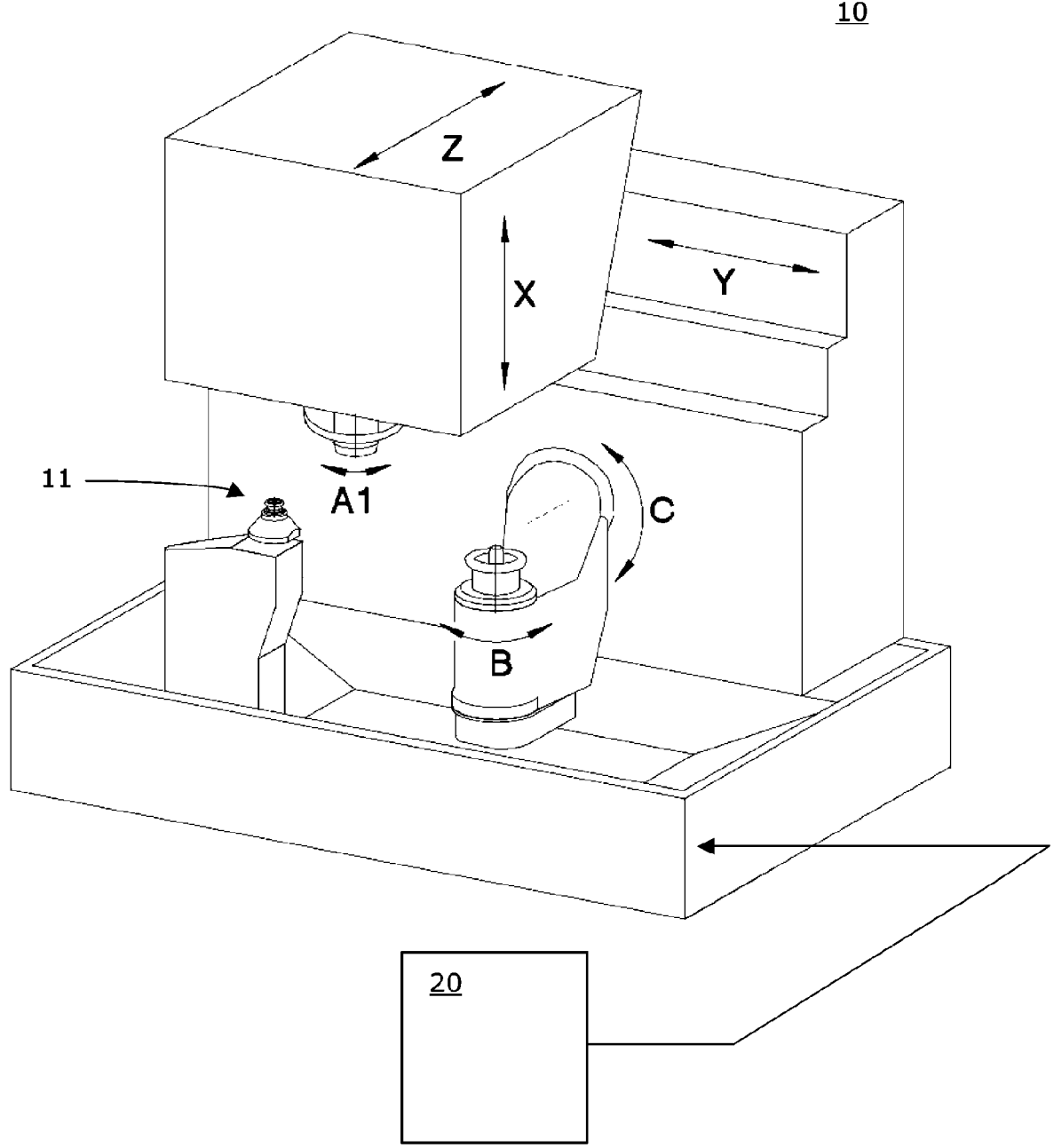
FIG. 1 shows a schematic illustration of a bevel gear grinding machine having axis identifications.

An exemplary CNC-controlled spiral bevel gear grinding machine 10 is shown in FIG. 1. A contrast to the known machine concepts for bevel gear machine tools, the grinding machine 10 has a vertical grinding spindle (A1 axis). The workpiece to be machined is seated on the B axis. However, the invention which is described hereafter may also be implemented on other grinding machines.

As described at the beginning, the grinding discs are subject to wear. In connection with FIG. 2, a grinding disc is assumed which does not have rapid wear after the dressing, or a grinding disc is used in which the phase of rapid wear has been overcome. However, this grinding disc nonetheless displays "normal" wear, which may be compensated for in that when machining the n tooth gaps of a gear wheel having n teeth, a corresponding compensation (in the meaning of a restraint) is performed for each tooth gap. The compensation, which decreases with each tooth gap, is shown in the upper image in FIG. 2. The compensation shown is a so-called linear compensation, as illustrated by the dotted diagonal line.

This linear compensation is used because the "normal" wear of the grinding disc is essentially linear. Because the grinding disc fundamentally becomes smaller and smaller—in very simplified terms—with each manufactured tooth gap, the restraint must correspondingly decrease. The corresponding plunging depth of the grinding disc is shown in the lower image of FIG. 2. The horizontal line T represents the plunging depth of an ideal grinding disc, which is not subject to any wear. Because of the noted "normal" wear, the grinding disc must plunge somewhat deeper into the workpiece for each tooth gap to be manufactured, which is indicated by the continuously sinking, dashed line T1.

Figure 2:
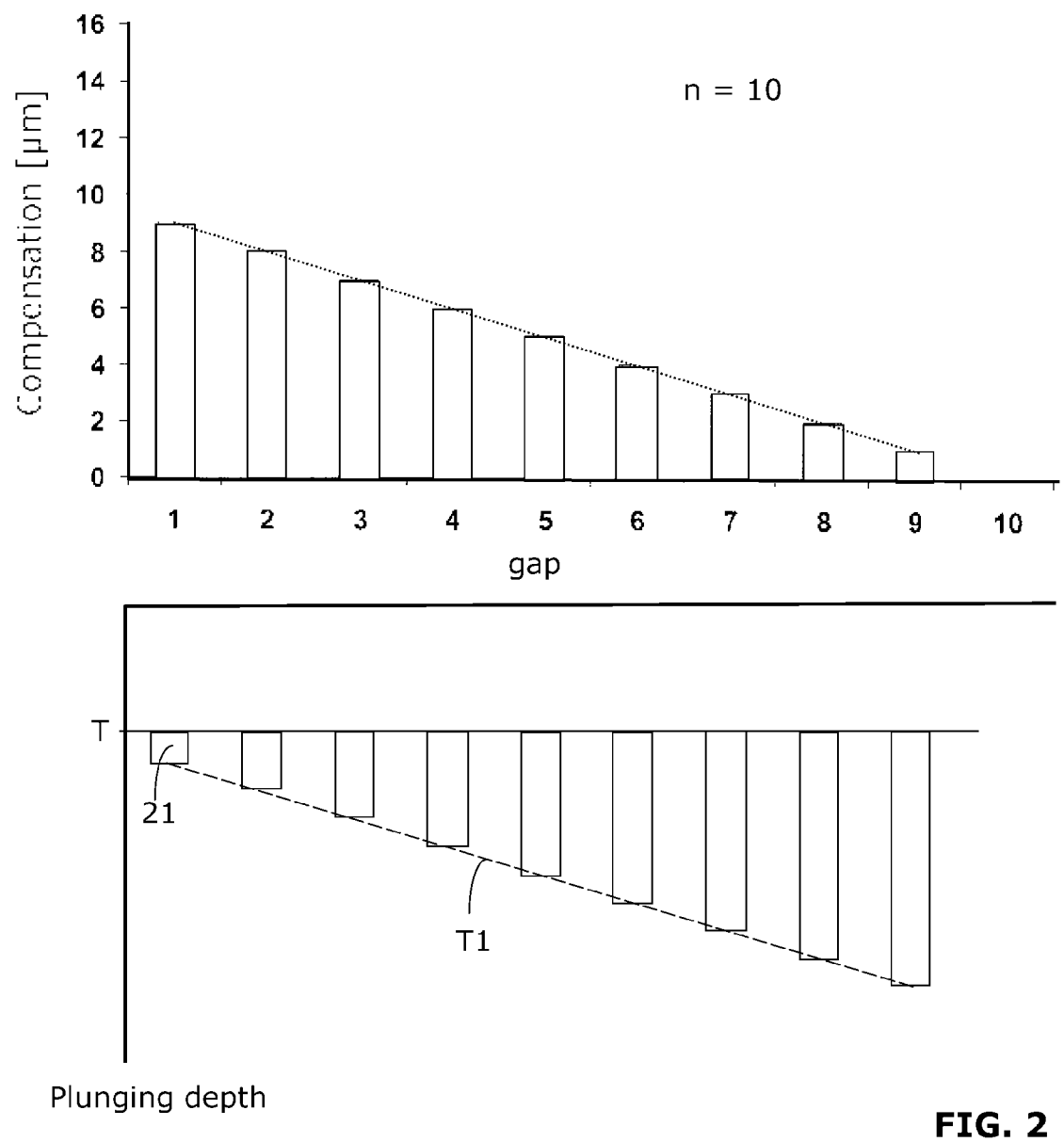
FIG. 2 shows a schematic illustration of a conventional grinding procedure using linear compensation

A further effect may be recognized in FIG. 2. Because the grinding disc experiences a so-called displacement (reset force) upon plunging into the tooth gap, it must plunge somewhat deeper than would actually be necessary as purely calculated. For the first tooth gap (identified by 1), the grinding disc must thus plunge somewhat deeper than T, which is indicated by the small column 21. In other words, this means that the effective plunging depth T1 (shown as a dashed line) does not begin entirely at T, but rather the machine data must be set in such a way that the grinding disc plunges with a certain pressure into the tooth gap.

As noted at the beginning, the grinding discs are dressed from time to time when they are worn. The dressing is frequently performed after the machining of each workpiece, sometimes also after several workpieces, if the service life of the grinding disc permits it. The profiling (dressing) of the grinding disc may be performed CNC-path controlled using a diamond dressing roll in the grinding machine 10 shown. A corresponding dressing device 11 may be provided on the grinding machine 10, so that the grinding disc does not have to be unclamped for the dressing.

After the dressing, the grinding disc is subject to so-called rapid wear, which is not linear and is significantly more strongly pronounced than the "normal" wear.

Accordingly, another approach is followed according to the invention, which also allows the rapid wear to be compensated for. It is taken into consideration that as little time as possible is to be lost upon the use of a freshly dressed grinding disc, and each newly dressed grinding disc is used to manufacture as many tooth gaps as possible.

Figure 3:
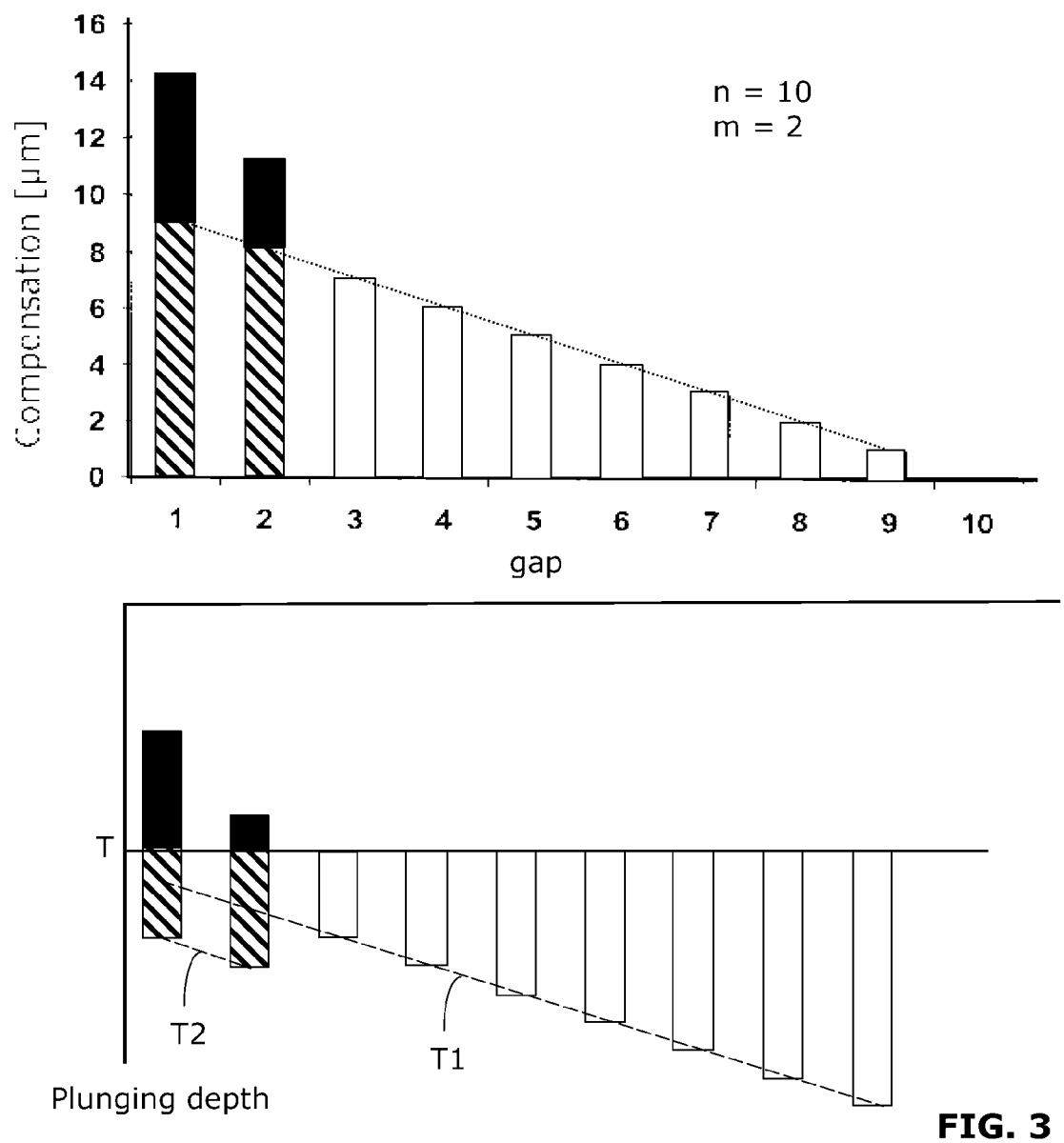
FIG. 3 shows a schematic illustration of a grinding procedure according to the invention having linear and additive compensation.

The machining of a gear wheel having n teeth and having n tooth gaps is again discussed. A corresponding example is shown in FIG. 3 on the basis of a gear wheel having n=10 teeth and n=10 tooth gaps (n is an integer greater than zero). The grinding disc plunges in sequence into each of the n tooth gaps up to a predefined plunging depth. If it is a freshly dressed grinding disc, the following method is used:

a) At the beginning of the machining of the gear wheel, the grinding disc plunges using a predefined first restraint in relation to the normal predefined plunging depth into m of the n tooth gaps. The number m=1, 2, or 3 and m<n. This step is also referred to as pre-machining. This pre-machining is graphically shown by black blocks in FIG. 3 and m=2 in the example shown.

b) The remaining n–m (i.e., 8) tooth gaps are subsequently machined using the predefined, normal plunging depth. This normal machining of the tooth gaps 3 through 10 is shown in the upper graphic in FIG. 3 by white blocks. A linear compensation is again applied here in the example shown (similarly to FIG. 2).

c) Finally, the m tooth gaps are post-machined once again using the grinding disc (shown in FIG. 3 by crosshatched blocks), the grinding disc plunging into these m tooth gaps with a predefined second restraint in relation to the normal predefined plunging depth during this post-machining.

The corresponding plunging depth of the grinding disc is shown in the lower image of FIG. 3. The horizontal line T represents the plunging depth of an ideal grinding disc, which is not subject to any wear. Because of the noted "normal" wear, the grinding disc must plunge somewhat deeper into the workpiece for each tooth gap to be manufactured, which is indicated by the continuously falling, dashed line T1. As described, a pre-machining method is performed according to the invention, after the grinding disc has been freshly dressed. In the scope of this pre-machining method, the grinding disc does not plunge deeply into m of the n tooth gaps as would normally be the case. A dressing compensation is thus applied when establishing the appropriate restraint. It may thus be quasi-ensured that no more material is abraded from the tooth gaps than necessary during the pre-machining using the freshly dressed grinding disc. In addition, it is ensured by these additional pre-machining steps that the grinding disc passes quickly from rapid wear into the normal wear. It is important that this pre-machining method using the freshly dressed disc is performed on the concrete workpiece and not on another workpiece. I.e., the freshly dressed grinding disc is also productively used in the pre-machining.

After the first two tooth gaps 1 and 2 (m=2) have now been pre-machined, as indicated by the black blocks in the lower image of FIG. 3, the grinding disc is used to machine the tooth gaps 3 through 10, as shown by the white blocks. After the gap 10 has been manufactured, the workpiece is rotated further around the axis B of the grinding machine 10 and the grinding disc plunges back into the first tooth gap to finish the machining of this tooth gap. This finish machining is shown by crosshatched blocks in the lower graphic of FIG. 3. Because the first tooth gap was already nearly finished in the scope of the pre-machining method, the grinding disc no longer has to plunge quite so deeply. On the other hand, it must be taken into consideration that the geometry of the grinding disc has changed because of the normal wear. Therefore, a linear compensation is again applied during finish machining (post-machining) of the first and second tooth gaps, as indicated in FIG. 3 by the continuously falling line T2. However, it is not absolutely necessary according to the invention to apply a corresponding compensation during the post-machining.

In summary, it may be stated that according to the invention pre-machining is performed using a special restraint for a specific number m (with m=1, 2, or 3) of tooth gaps, before the regular machining of the tooth gaps then follows. The post-machining of the m pre-machined teeth then occurs at the end of the regular machining. The machining of the tooth gaps is performed in the single-indexing method, i.e., discontinuously, according to the invention.

Because it is a CNC-programmable grinding machine 10, in a programming step, the grinding machine 10 may be prepared in such a way that in addition to the n tooth gaps to be manufactured, m virtual tooth gap(s) are defined. It is to be ensured that the peripheral position of each virtual tooth gap essentially coincides with the peripheral position of one of the n tooth gaps.

A grinding machine 10 which has software 20 for controlling the axes, as indicated in FIG. 1, is especially preferable. The software controls the machining sequence—if it is executed step-by-step by the grinding machine 10 during the execution—so that the steps according to the invention are executed at the beginning of the machining of the gear wheel after the use of a freshly dressed grinding disc or after the dressing in the grinding machine 10.

A grinding machine 10 which provides or receives a signal or corresponding information, which indicates that a freshly dressed grinding disc which will be used next, is especially preferred. In a grinding machine 10 as shown as an example in FIG. 1, this signal may be generated by the machine 10, because the dressing of the grinding disc occurs in the machine 10.

The grinding machine 10 is preferably designed in such a way that it automatically changes into a compensation mode to perform the compensation according to steps a) and c).

The described method is very especially suitable for the machining of bevel gear pinions and/or crown gears.

The invention claimed is:

1. A method for the chip-removing machining of the tooth flanks of a gear wheel having n teeth and n tooth gaps on a multiaxis grinding machine, a grinding disc, which may be dressed, being used for the machining and one of the n tooth gaps after another being machined using this grinding disc in a single indexing method, in that the grinding disc plunges into each of the n tooth gaps up to a predefined plunging depth (T1), characterized in that, if it is a freshly dressed grinding disc,
  a) at the beginning of the machining of the gear wheel, the grinding disc plunges using a predefined first restraint into m of the n tooth gaps in relation to the normal predefined plunging depth, to pre-machine these m tooth gaps, whereby m=1, 2, or 3 and m<n,
  b) the remaining n−m tooth gaps are subsequently machined using the predefined plunging depth (T1), and
  c) finally the m tooth gaps are once again post-machined using the grinding disc, the grinding disc plunging into these m tooth gaps during this post-machining using a predefined second restraint of the normal predefined plunging depth.

2. The method according to claim 1, characterized in that, when the predefined plunging depth (T1) is established, a linear compensation is applied, which has the result that at least in step b), the predefined plunging depth (T1) increases by a small amount with each tooth gap.

3. The method according to claim 1, characterized in that, when the first restraint is established, a dressing compensation is applied, which has the result that immediately after the dressing of the grinding disc, during the pre-machining according to step a), a first of the m tooth gaps is machined using a greater restraint than a second of the m tooth gaps.

4. The method according to claim 1, characterized in that the grinding machine is prepared in a programming step in such a way that in addition to the n tooth gaps to be manufactured, m virtual tooth gap(s) is/are defined, the peripheral position of each virtual tooth gap essentially being congruent with the peripheral position of one of the n tooth gaps.

5. The method according to claim 1, characterized in that
  the grinding machine provides or receives a signal or corresponding information which indicates that a freshly dressed grinding disc is to be used next, and
  the grinding machine automatically changes into a compensation mode to perform the compensation according to steps a) and c).

6. The method according to claim 1, characterized in that the gear wheel is a bevel gear pinion or a crown gear.

7. A multiaxis grinding machine comprising software for controlling said multiaxis grinding machine, which is designed for the chip-removing machining of the tooth flanks of a gear wheel having n teeth and n tooth gaps in the single indexing method, a grinding disc, which may be dressed, being used for the machining and one of the n tooth gaps after another being machined discontinuously using this grinding disc, characterized in that the software controls the machining sequence during the execution by the grinding machine in such a way that, at the beginning of the machining of the gear wheel, after the insertion of a freshly dressed grinding disc in the grinding machine, the following steps are executed:
  a) plunging the grinding disc at the beginning of the machining of the gear wheel using a predefined first restraint in relation to a normal predefined plunging depth into m of the n tooth gaps, to pre-machine these m tooth gaps, whereby m=1, 2, or 3 and m<n,
  b) subsequently machining the remaining n−m tooth gaps using the predefined plunging depth, and
  c) finally post-machining the m tooth gaps using the grinding disc, the grinding disc plunging into these m tooth gaps during this post-machining using a predefined second restraint in relation to the normal predefined plunging depth.

8. The multiaxis grinding machine according to claim 7, characterized in that the software is programmable in such a way that when the predefined plunging depth is established, a linear compensation is applied, which has the result that at least in step b), the predefined plunging depth increases by a small value with each tooth gap.

9. The multiaxis grinding machine according to claim 7, characterized in that the software is programmable in such a way that when the first restraint is established, a dressing compensation is applied, which has the result that immediately after the dressing of the grinding disc, during the pre-machining according to step a), a first of the m tooth gaps is machined using a greater restraint than a second of the m tooth gaps.

10. The multiaxis grinding machine according to claim 7, characterized in that the software is programmable in such a way that in addition to the n tooth gaps to be manufactured, m virtual tooth gap(s) may be defined, the peripheral position of each virtual tooth gap essentially being congruent with the peripheral position of one of the n tooth gaps.

11. The multiaxis grinding machine according to claim 7, characterized in that the software comprises a routine to establish whether a freshly dressed grinding disc is being used, this routine transferring the grinding machine into a compensation mode after the recognition/detection of a freshly dressed grinding disc.

\* \* \* \* \*